(12) United States Patent
Constable et al.

(10) Patent No.: US 9,024,963 B2
(45) Date of Patent: May 5, 2015

(54) SELECTING COLOR SPACES FOR CINEMA OR VIDEO DATA

(75) Inventors: Peter Constable, Poulsbo, WA (US); Vladimir Potap'yev, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 2212 days.

(21) Appl. No.: 11/940,267

(22) Filed: Nov. 14, 2007

(65) Prior Publication Data

US 2014/0040743 A1    Feb. 6, 2014

(51) Int. Cl.
*G09G 5/02* (2006.01)
*H04N 1/00* (2006.01)

(52) U.S. Cl.
CPC ...................... *H04N 1/00* (2013.01)

(58) Field of Classification Search
USPC .................................................. 345/604, 600
See application file for complete search history.

(56) References Cited

U.S. PATENT DOCUMENTS

| | | | | |
|---|---|---|---|---|
| 6,269,184 B1 * | 7/2001 | Spaulding et al. | ............ | 382/167 |
| 7,333,154 B2 * | 2/2008 | Dean et al. | ................. | 348/722 |
| 7,403,206 B1 * | 7/2008 | Liu et al. | ................... | 345/594 |
| 7,667,880 B2 * | 2/2010 | Borg | ........................ | 358/504 |
| 7,728,845 B2 * | 6/2010 | Holub | ............................ | 345/589 |
| 2001/0012396 A1 * | 8/2001 | Kumada | ......................... | 382/162 |
| 2002/0093509 A1 * | 7/2002 | Murashita et al. | ............ | 345/589 |
| 2002/0163657 A1 * | 11/2002 | Bogdanowicz et al. | ....... | 358/1.9 |
| 2003/0206665 A1 * | 11/2003 | Pettigrew | ....................... | 382/284 |
| 2003/0227490 A1 * | 12/2003 | Kim | .............................. | 345/810 |
| 2004/0056965 A1 * | 3/2004 | Bevans et al. | ............... | 348/222.1 |
| 2004/0061707 A1 * | 4/2004 | Yoshida | ......................... | 345/690 |
| 2005/0152612 A1 * | 7/2005 | Spaulding et al. | ............ | 382/254 |
| 2005/0253866 A1 * | 11/2005 | Kim et al. | ...................... | 345/594 |
| 2005/0280842 A1 * | 12/2005 | Rodriguez et al. | ............. | 358/1.5 |
| 2006/0181724 A1 * | 8/2006 | Dumarest | ...................... | 358/1.9 |
| 2006/0181921 A1 * | 8/2006 | Chu et al. | ....................... | 365/154 |
| 2006/0280360 A1 * | 12/2006 | Holub | ............................ | 382/162 |
| 2007/0285684 A1 * | 12/2007 | Borg | ............................... | 358/1.9 |
| 2008/0007748 A1 * | 1/2008 | Borg et al. | ..................... | 358/1.9 |
| 2009/0175536 A1 * | 7/2009 | Gutta et al. | .................... | 382/166 |

* cited by examiner

*Primary Examiner* — M Good Johnson
(74) *Attorney, Agent, or Firm* — Shook, Hardy & Bacon L.L.P.

(57) ABSTRACT

A computer-implemented method includes presenting one or more user interface controls configured to receive selection of a first color space, from a plurality of first color spaces corresponding to media encodings for recording cinema or video data, and a second color space, from a plurality of second color spaces corresponding to output devices, receiving the selection, combining a first transform corresponding to the first color space and a second transform corresponding to the second color space, in accordance with the selection, to form a combined transform, and providing the combined transform for use in previewing the cinema or video data in accordance with the output devices corresponding to the selection.

19 Claims, 5 Drawing Sheets

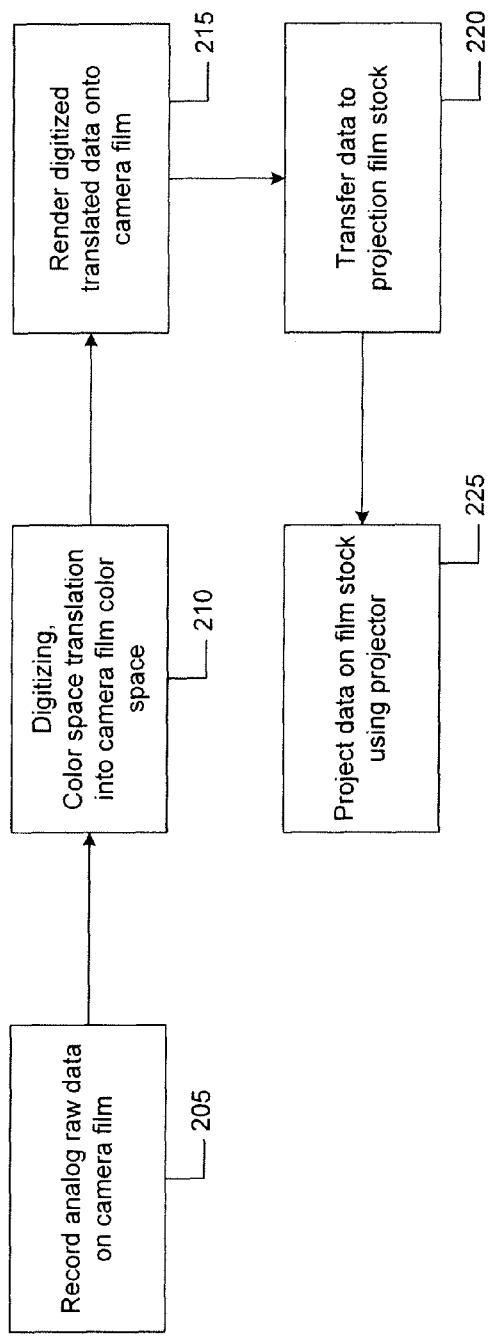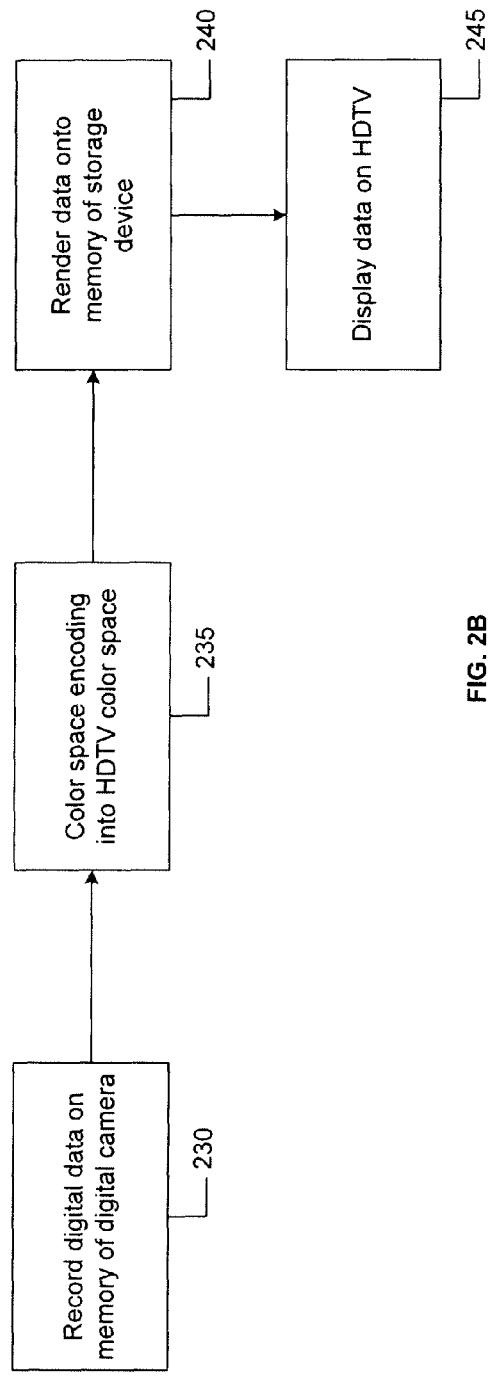
FIG. 2A
FIG. 2B

SELECTING COLOR SPACES FOR CINEMA OR VIDEO DATA

BACKGROUND

The present disclosure relates to previewing cinema or video data.

Cinema or video data can be recorded on a variety of media, e.g., camera film, memory of a digital camera, and the like, and displayed using a variety of output devices, e.g., theater projector, high definition television (HDTV), and the like. Factors, such as the film stock on which the cinema or video data is recorded, the type of theater projector used to project the data recorded on the film stock, and the like, can affect the appearance of cinema or video data. Such factors can be considered when visualizing the appearance of such data on a display device, such as a computer monitor.

SUMMARY

This specification describes technologies relating to selecting color spaces for cinema or video data.

In one aspect, a computer-implemented method is described. The method includes presenting one or more user interface controls configured to receive selection of a first color space, from a plurality of first color spaces corresponding to media encodings for recording cinema or video data, and a second color space, from a plurality of second color spaces corresponding to output devices, receiving the selecting, combining a first transform corresponding to the first color space and a second transform corresponding to a second color space, in accordance with the selection, to form a combined transform, and providing the combined transform for use in previewing the cinema or video data in accordance with the output devices corresponding to the selection.

This, and other aspects, can include one or more of the following features. Combining the first transform and the second transform can include combining the first transform and the second transform through one or more intermediate transforms corresponding to one or more intermediate color spaces, and concatenating the first transform, the one or more intermediate transforms, and the second transform to form the combined first transform. Providing the combined transform for use in previewing can include storing the selection. The first transform and the second transform can include profiles that conform to a format adopted by the International Color Consortium.

In another aspect, a computer program product, tangibly stored on a computer-readable medium, operable to cause data processing apparatus to perform operations is described. The operations include presenting one or more user interface controls configured to receive selection of a first color space, from a plurality of first color spaces corresponding to media encodings for recording cinema or video data, and a second color space, from a plurality of second color spaces corresponding to output devices, receiving the selecting, combining a first transform corresponding to the first color space and a second transform corresponding to a second color space, in accordance with the selection, to form a combined transform, and providing the combined transform for use in previewing the cinema or video data in accordance with the output devices corresponding to the selection.

This, and other aspects, can include one or more of the following features. Combining the first transform and the second transform can include combining the first transform and the second transform through one or more intermediate transforms corresponding to one or more intermediate color spaces, and concatenating the first transform, the one or more intermediate transforms, and the second transform to form the combined first transform. Providing the combined transform for use in previewing can include storing the selection. The first transform and the second transform can include profiles that conform to a format adopted by the International Color Consortium.

In another aspect, a system including a processor and a computer-readable medium including instructions to cause the processor to perform operations is described. The operations include presenting one or more user interface controls configured to receive selection of a first color space, from a plurality of first color spaces corresponding to media encodings for recording cinema or video data, and a second color space, from a plurality of second color spaces corresponding to output devices, receiving the selecting, combining a first transform corresponding to the first color space and a second transform corresponding to a second color space, in accordance with the selection, to form a combined transform, and providing the combined transform for use in previewing the cinema or video data in accordance with the output devices corresponding to the selection.

This, and other aspects, can include one or more of the following features. Combining the first transform and the second transform can include combining the first transform and the second transform through one or more intermediate transforms corresponding to one or more intermediate color spaces, and concatenating the first transform, the one or more intermediate transforms, and the second transform to form the combined first transform. Providing the combined transform for use in previewing can include storing the selection. The first transform and the second transform can include profiles that conform to a format adopted by the International Color Consortium.

In another aspect, a system is described. The system includes a first storage area for storing media encoding of cinema or video data, the media encoding corresponding to a compositing color space, a second storage area for storing scene-referred data, the scene-referred data obtained by a first transformation of the media encodings from the compositing color space to an output color space, a third storage area for storing output-referred data, the output-referred data obtained by a second transformation of the scene-referred data from the output color space to an output device color space, a display device for displaying preview data, the preview data obtained by a third transformation of the output-referred data from the output device color space to a color space corresponding to the display device, and a computer configured to perform operation comprising presenting, on the display device, one or more user interface controls configured to enable a user to provide at least an output color space and an output device color space, and in response to receiving the at least an output color space and an output device color space, selecting a first transform corresponding to the output color space and a second transform corresponding to the output device color space, wherein a combination of the first transform and the second transform is used in the second transformation.

This, and other aspects, can include one or more of the following features. The one or more user interface controls display a list displaying names of color spaces, wherein the user provides a color space by selecting a corresponding name from the list. The first transformation includes transformation from the compositing color space to the output color space through a profile connection space. The third transformation includes transformation from the output color space to the output device color space through a profile connection space. The first storage area and the second storage area reside on a first storage device and the third storage area resides on a second storage device. The first storage area, the second storage area, and the third storage area reside on a corresponding first storage device, a second storage device, and a third storage device, respectively.

Particular implementations of the subject matter described in this specification can be implemented to realize one or more of the following advantages. Enabling the selection of color spaces for cinema or video data can allow accurate previewing of the data. A user can understand and articulate the color experience as defined in the final video or projected film. Further, the user can be presented with the choices of transforms, corresponding to color spaces, to enable the user to mix and match the different kinds of color spaces. Such mixing and matching offers the user, flexibility in previewing media prior to storing or displaying the media. Combining, for effective preview, scene-referred and output-referred color spaces can enable proper preview of data in digital cinema and video workflows.

The details of one or more implementations are set forth in the accompanying drawings and the description below. Other features, aspects, and advantages will become apparent from the description, the drawings, and the claims.

BRIEF DESCRIPTION OF THE DRAWINGS

FIGS. 2A and 2B are flow diagrams of cinema and video work flows, respectively.

Like reference numbers and designations in the various drawings indicate like elements.

DETAILED DESCRIPTION

Figure 1:
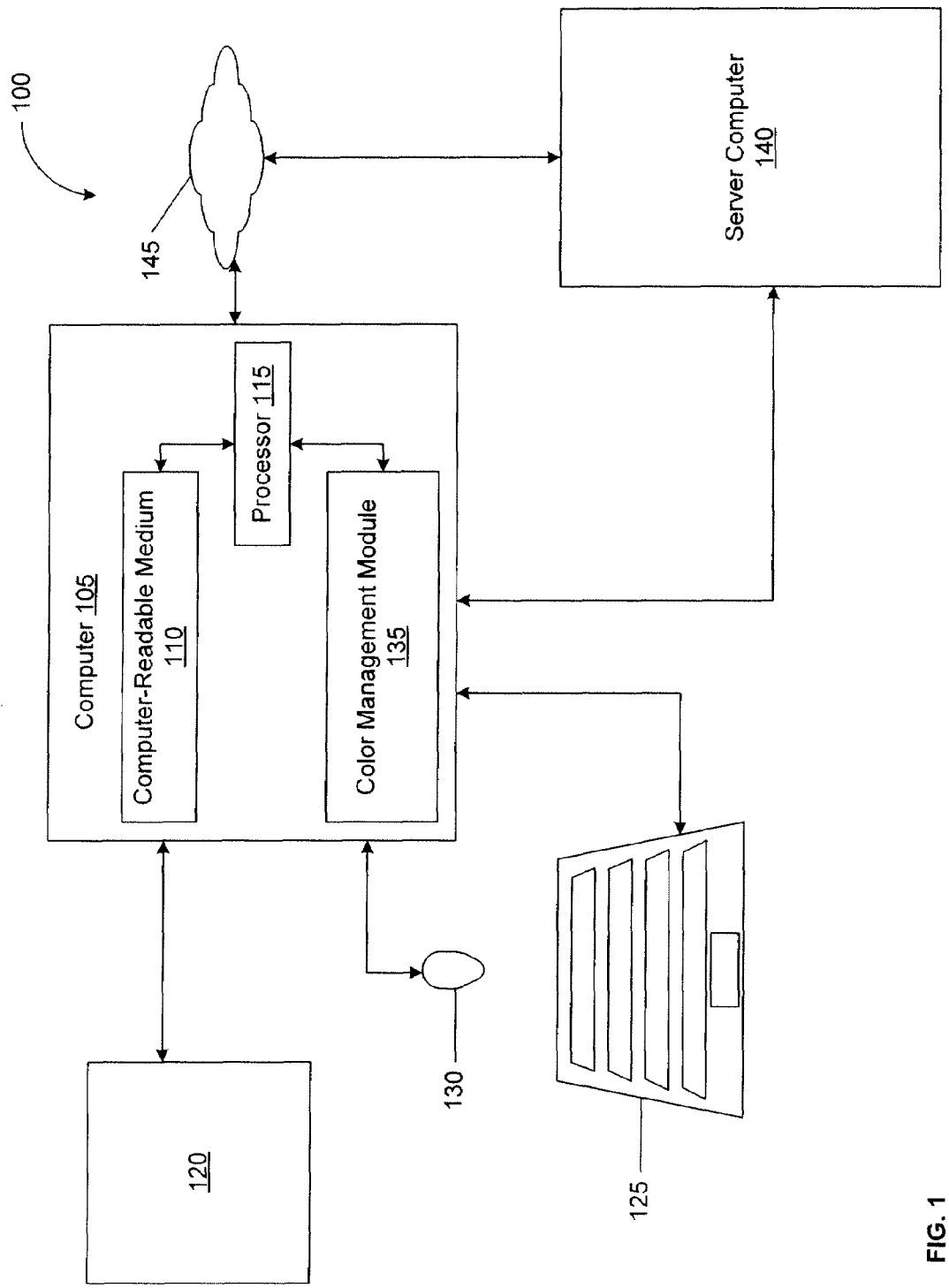
FIG. 1 is a schematic diagram of an example system for previewing cinema or video data.

FIG. 1 depicts a schematic diagram of an example of a system 100 for previewing cinema or video data, based on the media on which the data can reside and the output devices on which the data can be viewed. For example, cinema data can be recorded on camera film, transferred to a projection film stock, and viewed using a projector in a theater. Video data can be captured using a digital camera, stored on a memory device, and viewed using a variety of output devices such as a HDTV, a standard definition TV (SDTV), and the like. The system 100 can receive selection of a first color space corresponding to an encoding, e.g., media on which the video data is played back, and a second color space corresponding to an output device, from a user. In implementations involving cinema workflows, the analog data that is recorded on a camera film can be digitized, translated into a compositing color space, e.g., a color space relating to the working color space, and rendered back on the camera film. The data that is rendered onto the camera film can subsequently be transferred to a film stock and projected using a projector. In such implementations, the system 100 can receive selection of a first color space related to the media on which the data is encoded, e.g., the camera film on which the digitized data is rendered, and a second color space, such as a color space related to an output device, e.g., the projection film stock and the theater projector. The first color space can correspond to scene-referred data and the second color space can correspond to output-referred data. Combining scene-referred and output-referred color spaces can enable proper preview of data in digital cinema and video workflows.

The system 100 includes a computer 105 configured to present a user interface, where the user interface includes one or more user interface controls that can refer to multiple first color spaces and multiple second color spaces. In some implementations, the computer 105 can include a computer-readable medium 110 operatively coupled to a processor 115 configured to cause the computer 105 to perform one or more operations. For example, the computer 105 can be included in any computer system, e.g., desktop computer, laptop computer, personal digital assistant (PDA), and the like. The system 100 further includes a display device 120 operatively coupled to the computer 105, on which the user interface, that refers to the multiple first color spaces and the multiple second color spaces, is displayed. Further, the system 100 includes input devices such as a keyboard 125, a pointing device 130, e.g., a mouse, and the like, operatively coupled to the computer 105, to enable a user to provide a selection of a first color space, corresponding, e.g., to scene-referred data, and a second color space, corresponding, e.g., to output-referred data.

The computer 105 is further configured to receive the selection and to combine a first transform corresponding to the first color space and a second transform corresponding to the second color space, in accordance with the selection, to form a combined transform. In some implementations, the first transform and the second transform can be combined by executing the transforms in succession to produce the combined transform. The computer 105 is also configured to provide the combined transform for use in previewing the cinema or video data in accordance with the media and the output devices. In some implementations, the computer 105 can combine the first transform, corresponding to the color space of the scene-referred data, and the second transform, corresponding to the color space of the output-referred data, through one or more intermediate transforms. The intermediate transforms can correspond to one or more intermediate color spaces. For example, the intermediate transforms can be built using one or more intermediate color spaces. The computer 105 can concatenate the first transform, the one or more intermediate transforms, and the second transform to form the combined transform. In order to enable visualizing the cinema or video data on the display device 120, the computer 105 can be further configured to combine the combined transform with a transform corresponding to a color space of the display device 120.

In some implementations, the system 100 can include a color management module 135 configured to convert the cinema or video data according to the combined transform. An application (not shown) for manipulating cinema and video data can be installed on the computer 105 and the color management module 135 can be part of the installed application. In such implementations, the color management module 135 can be executed by the processor 115 to perform the transformation of the cinema or video data according to the combined transform.

In other implementations, the color management module 135 can reside on a server computer 140, operatively coupled to the computer 105 over a network 145. Upon forming the combined transform, the computer 105 can transmit the combined transform to the server computer 140 over the network 145 to convert the cinema or video data in accordance with the combined transform. For example, the server computer 140 can receive the cinema or video data, the combined transform, obtained by combining the first transform based on the color space corresponding to the scene-referred data, and the second transform based on the color space corresponding to the output-referred data, and the color space corresponding to the display device 120 from the computer 105. The server computer 140 can be configured to cause the color management module 135, residing on the server computer 140, to convert the cinema or video data from the color space of the scene-referred data to the color space of the output-referred data, through the combined transform, and transmit the transformed data to the computer 105. The computer 105 can display the transformed data on the display device 120. In this manner, a user viewing the data can visualize the appearance of the cinema or video data when the data resides on a specific media and is viewed using a specific output device. In some implementations, information used to perform the converting can be transmitted from the computer 105 to the server computer 140, and the transformed data can be transmitted from the server computer 140 to the computer 105, through a network 145, e.g., the Internet.

In other implementations, the server computer 140 can be configured to provide the user interface to the display device and allow the user to select the first and second transforms. The server computer 140 can also be configured to receive the first and second transforms, form the combined transform, and provide the combined transform to the computer 105. The color management module 135 can reside in the computer 105 and can transform cinema or video data, residing in the computer 105, using the combined transform received from the server computer 140.

FIG. 2A is a schematic of a flow diagram for a cinema workflow. The raw cinema data, recorded on a camera film at 205, is in analog format. The analog data can be digitized and translated into a compositing color space, e.g., the working color space related to the camera film. For example, the cinema data in the analog format can be encoded into cineon file format, and values can be associated with the raw data, where the values represent the printing density on the camera film. Subsequently, the digitized data can be rendered into the color space of the camera film at 215 and made available for transferring to an output device, e.g., by imaging to a camera film. In this example, the camera film is used to transfer the data to a theatrical projection film stock 220 used in a projector to display the cinema data. The digitized, translated data can be transferred to the film stock at 220. The data on the film stock can be projected using a projector at 225. In other examples, the digitized, translated data can be rendered in HDTV format or onto a webpage encoded with Adobe® Flash® player offered by Adobe, Inc. (San Jose, Calif.). The system 100 enables a user to visualize the appearance of the cinema data as it will appear when recorded on a camera film, transferred to a projection film stock, and projected using a projector, by presenting the user with a user interface that allows the user to select a first color space corresponding to the camera film, and a second color space, combining corresponding transforms corresponding to the projection film stock and the projector, and processing the data accordingly.

FIG. 2B is a flow diagram of a video workflow. The raw video data captured, e.g., using a digital camera at 230, can be in digital format, and can be stored, e.g., on a memory device. If the raw video data is to be viewed on a HDTV, a color space translation of the raw, digital data into HDTV color space, can be performed at 235. In some implementations, the data can be translated in the video workflow, e.g., when the user chooses to composite in a non-HDTV color space. In other implementations, the data captured by the camera and encoded into an HDTV (or SDTV) color space can be composited and output to be displayed on an HDTV, where the HDTV monitor can render the data to the screen. Subsequent to the output, the translated video data can be rendered onto the memory device at 240, and transmitted for display on a HDTV at 245, where the color space of the HDTV monitor can be the SRGB color space. In other examples, the color space translation of the raw video data can be in the color space corresponding to SDTV, either the NTSC or the PAL format. Translating the raw video data into a compositing color space can include re-encoding values from the memory device into values related to the compositing color space. The system 100 enables a user to visualize the appearance of the video data recorded on a memory device using a digital camera and viewed on an output device by allowing the user to select a first color space corresponding to the color spaces of the transmission format, such as high definition, standard definition, and the like, and a second color space corresponding to color spaces that models the devices that are built to render the video data in the desired transmission format.

Figure 3:
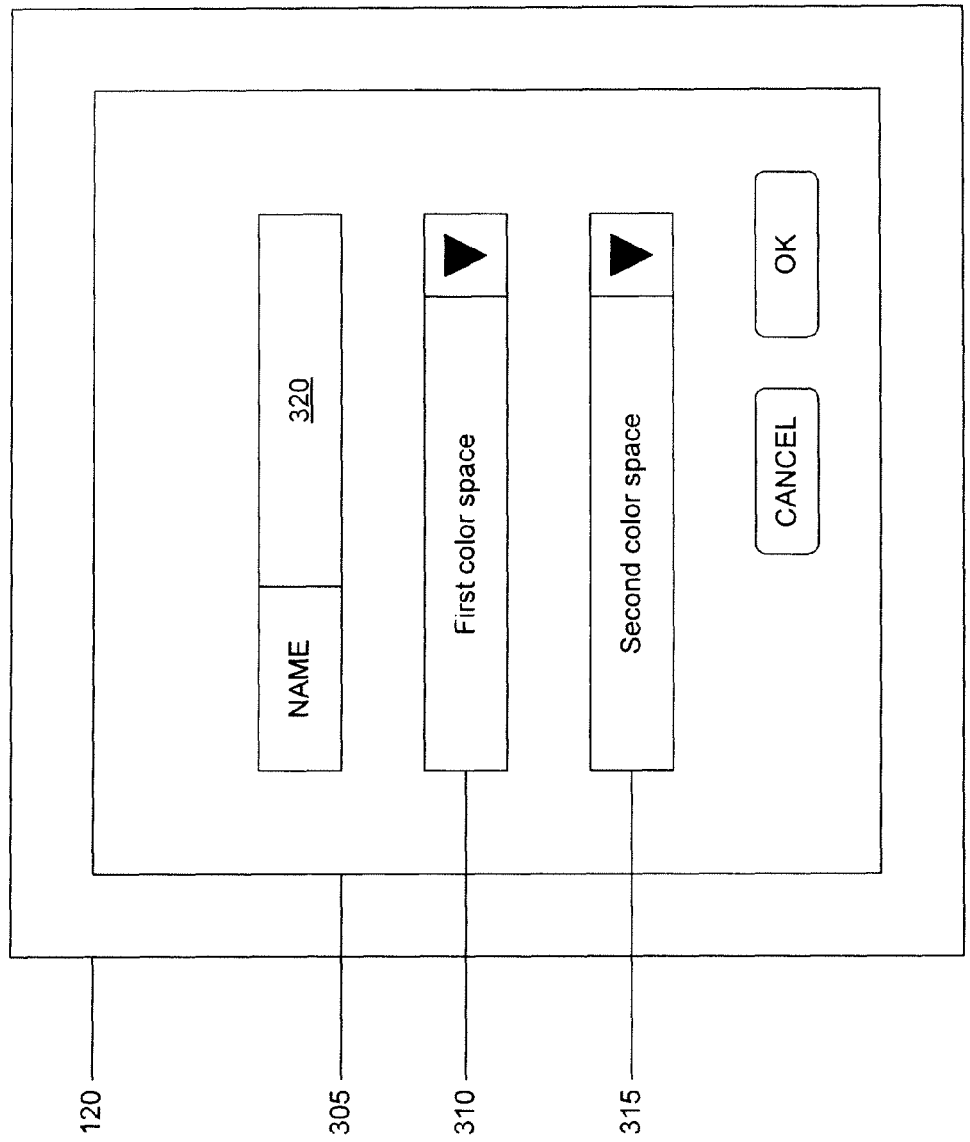
FIG. 3 is a schematic diagram of a user interface for selecting color spaces.

FIG. 3 is a schematic diagram of a user interface 305 for selecting color spaces. The user interface 305 can be offered by a software application, installed on the computer 105, that can include instructions that can be executed by the processor 115 to cause the computer 105 to perform operations including combining a first transform corresponding to a first color space and a second transform corresponding to a second color space, to form a combined transform. The instructions can reside on the computer-readable medium 110 which can be, e.g., a CD-ROM. Based on the instructions, the computer 105 can enable a user to preview cinema or video data, based on the media on which the data can reside and the output devices on which the data can be viewed. In some implementations, a user can use the input devices to cause the computer 105 to display the user interface 305 on the display device 120. For example, the user can select an icon, corresponding to the software application, that is displayed on the display device 120. In response to the selection, the computer 105 can display the user interface 305 on the display device 120. In other implementations, the user interface 305 for selecting color spaces can be included in the user interface related to the software application. For example, the user interface related to the software application can include multiple selectable objects residing in one or more menus, where each selectable object causes a user interface to be displayed on the display device 120. One such selectable object can correspond to the user interface 305, and selecting the object can cause the user interface 305 to be displayed in the display device 120. In some implementations, the user interface 305 can be provided by other software, e.g., as a plug-in.

In some implementations, the user interface 305 can include an object 310 displaying a name related to a first color space and an object 315 displaying a name related to a second color space. The first color space can correspond to an encoding on a media, e.g., a camera film on which the cinema data is stored, a video signal in a memory of a digital camera on which the video data is stored, and the like, and the second color space can correspond to an output device, e.g., theater projector. The user interface 305 can include a first drop-down list (not shown) including objects displaying names related to multiple first color spaces corresponding to media encodings. For example, the drop-down list can be indicated by a symbol, e.g., an inverted triangle, which the user can select, e.g., using an input device. In response to the user selecting the symbol, the computer 105 can display the first drop-down list. Similarly, the user interface 305 can include a second drop-down list (not shown) including objects displaying names related to multiple second color spaces corresponding to final output devices. The user can select a first color space, e.g., by positioning a cursor operated by the pointing device 130 over an object in the first drop-down list, and selecting the object. In response to the selection, the computer 105 can hide the drop-down list and display the selected name in the object 310. In a similar manner, the user can select a second color space from the drop-down list of second color spaces, and the computer 105 can display the selected name in the object 315. In some implementations, the objects 310 and 315 can display radio buttons, check boxes, and the like, to enable a user to make selections. In some implementations, the names related to the color space can be those of known media or devices, e.g., camera film, HDTV, film stock, theater projectors, and the like. The color spaces corresponding to the known media encodings or devices can be included in the software application and can be stored in the computer 105 when the software application is stored in the computer 105. When a user selects the name of a media or a device from the list of names in the drop-down list, the computer 105 can identify the color spaces corresponding to the selected media or devices.

In other implementations, the user interface 305 can display the name of a media in object 310 and the name of an output device in object 315. For example, the object 310 can display the name "Camera Film" and the object 315 can display the name "HDTV". Further, the first drop-down list and the second drop-down list can display the names of multiple media encodings and multiple output devices, respectively. A user can select a media and an output device from the displayed list, and the computer 105 can display the names of the selections in the corresponding objects.

In some implementations, the user interface 305 can include an object 320, e.g., a text box, in which a user can enter a name under which the selected first color space and the selected second color space can be stored. For example, the user can select a first color space from the first drop-down list and the computer 105 can display the name of the selected first color space in object 310. Similarly, the user can select a second color space from the second drop-down list and the computer 105 can display the name of the selected second color space in object 315. Subsequently, the user can enter text in object 320, and the computer 105 can store the names of the selected first color space and the selected second color space under the text entered in object 320. If the user selects the name in object 320 during a subsequent selection of color spaces, the computer 105 can retrieve the previously selected first color space and the previously selected second color space.

Figure 4:
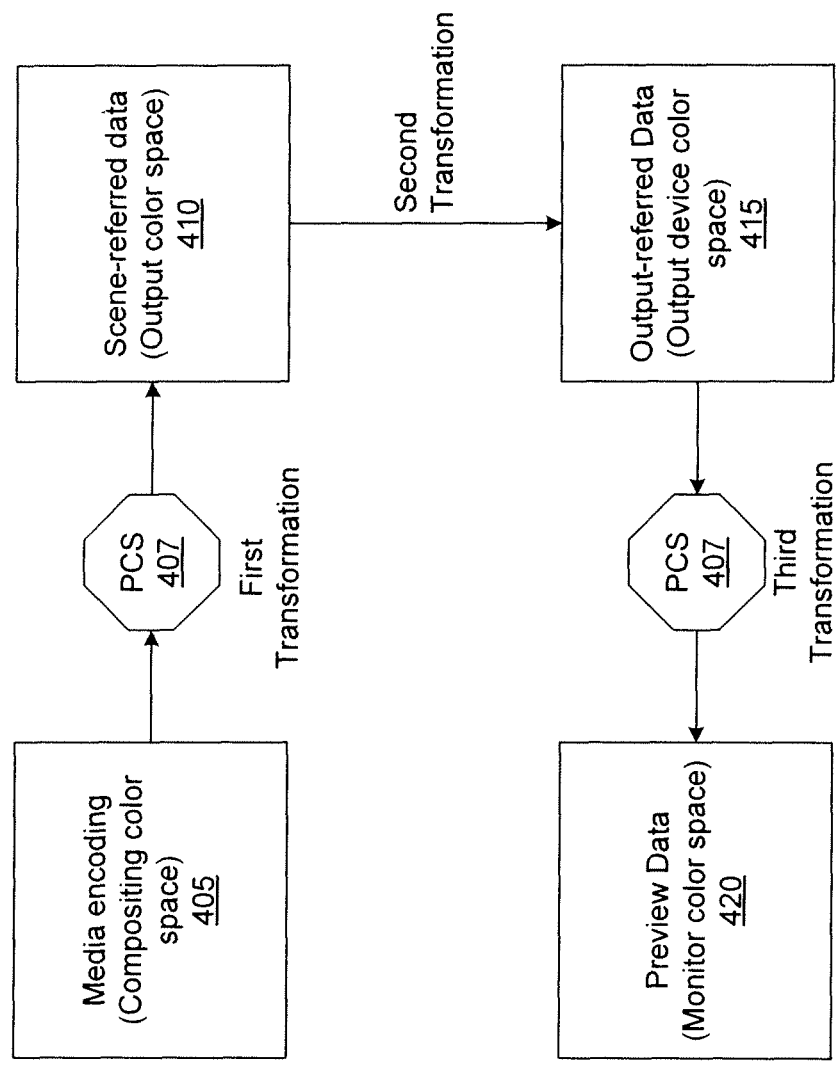
FIG. 4 is a flow diagram of transformations between color spaces.

FIG. 4 depicts a flow diagram of transformations between color spaces. In cinema workflows, the media encoding 405 can undergo a first transformation from a compositing color space (e.g., Adobe RGB (1998) using a linear tone response, ProPhoto RGB using a linear tone response) to an output color space 410 (e.g., HDTV (Rec. 709), Kodak 5218/7218 Printing Density) and be rendered as scene-referred data. For example, the media encodings 405 can undergo the transformation from the compositing color space to the output color space through a profile connection space (PCS) 407. The first color space selected by the user using object 310 corresponds to the output color space. Subsequently, the scene-referred data can undergo a second transformation from an output color space 410 to an output device color space 415 (e.g., sRGB EIC61966-2.1, Kodak 2383 Theater Preview) and be available for rendering as output-referred data. The second color space selected by the user using object 315 corresponds to the output device color space. Then, the output-referred data can undergo a third transformation from the output device color space 415 to a monitor color space 420 (e.g., My Monitor profile) and be rendered on a monitor for preview. For example, the output-referred data can undergo the third transformation from the output device color space to the monitor color space through a PCS 407. In implementations of cinema workflow, a user can select a camera negative film to encode the previously digitized values. The digitized values encoded onto the camera negative film represent the scene-referred data and the color space represented by the digitized values represent the first color space. Subsequently, the user can select a second color space that represent the color characteristics of the projection film as well as the projector used to project the film in a theater.

In some implementations, the user interface 305 can include an object (not shown) that relates to the title of the color space of display devices. The default color space that is displayed in the object can be the title of the color space of the display device 120. When the object is selected, e.g., using the pointing device, a drop-down list (not shown) can be displayed that can include titles of color spaces of several display devices 120. The user can select a color space of a display device 120 on which the user wishes to visualize the cinema or video work flow. A transform corresponding to the selected display device 120 can be combined with the combined transform formed from the first and second color spaces to enable converting the cinema or video data for previewing.

Figure 5:
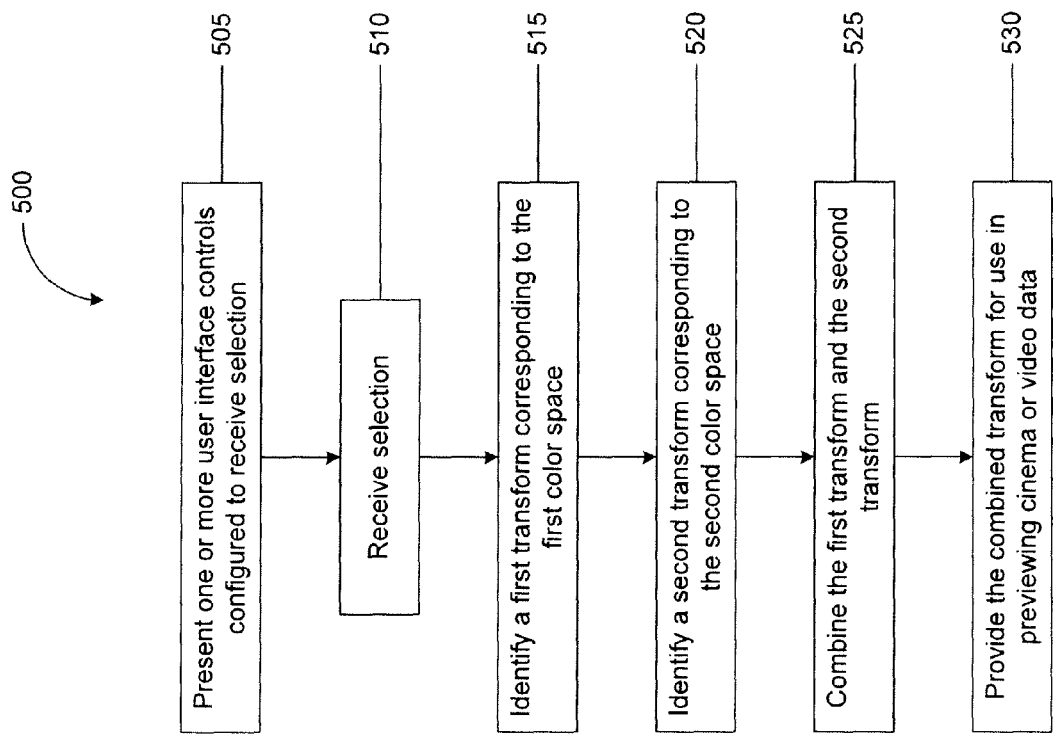
FIG. 5 is a flow chart of an example of a process for combining transforms based on output devices.

FIG. 5 depicts an example of a process 500 for combining transforms based on output devices including final output devices, such as theater projectors, and output formats such as those used to encode digital cinema or video data. The process 500 can present one or more user interface controls configured to receive selection at 505. The selection can include a first color space from multiple first color spaces corresponding to media encodings which cinema or video data are stored, and a second color space from multiple second color spaces corresponding to output devices on. For example, a software application including a user interface displaying user interface controls related to the multiple color spaces can be installed on the computer 105. The computer 105 can be configured to present the user interface, including the user interface controls, on a display device 120 upon receiving input from a user. In some implementations, the computer 105 can display the user interface controls for the multiple first color spaces as objects in a first drop-down list and the user interface controls for the multiple second color spaces as objects in a second drop-down list.

A user can select a first color space and a second color space from the first drop-down list and the second drop-down list, respectively, using the input devices. The process 500 can receive the selection at 510. For example, the computer 105 can detect that the user has selected an object representing the first color space and an object representing the second color space from the first drop-down list and the second drop-down list, respectively.

The process 500 can identify a first transform corresponding to the first color space at 515. For example, the software application, installed on the computer 105, can include multiple transforms corresponding to the multiple color spaces displayed in the user interface. The color spaces and the corresponding transforms can reside on the computer 105. When the computer 105 receives the selection of color spaces in the user interface, the computer 105 can identify the corresponding transforms. Thus, the computer 105 can identify a first transform corresponding to the first color space, where the first color space is related to the media on which the cinema or video data is stored. The process 500 can identify a second transform corresponding to the second color space at 520. For example, the computer 105 can receive the selection of the second color space corresponding to the output device, and identify the second transform corresponding to the second color space.

The process 500 can combine the first transform and the second transform at 525. For example, the computer 105 can combine the identified first transform and the identified second transform, in accordance with the selection, to form a combined transform. The first transform and the second transform can include profiles that conform to a format adopted by the International Color Consortium. The profiles corresponding to the output devices can be output-referred profiles, while those corresponding to the encoding on which the cinema or video data is stored can be scene-referred profiles. In some implementations, the computer 105 can combine the first transform and the second transform through one or more intermediate transforms corresponding to one or more intermediate color spaces. Subsequently, the computer 105 can concatenate the first transform, the one or more intermediate transforms, and the second transform to form the combined transform. The one or more intermediate transforms can be stored in the computer 105 when the software application is installed on the computer 105. In some implementations, the one or more intermediate color spaces can be transparent to the user.

The process 500 can provide the combined transform for use in previewing cinema or video data at 530. For example, the computer 105 can provide the combined transform to the user, e.g., by storing the combined transform and allowing the user to transfer the stored combined transform. The combined transform can be used to transform cinema or video data to visualize the appearance of the data when stored on the media, e.g., a camera film, and displayed using the output device, e.g., theater projector. The process of transforming the cinema or video data from the first color space, corresponding to the encoding on media, to the second color space, corresponding to the output device, can use a combination of matrices, 2D, and 3D look-up tables. The transforming can be a 2-stage process including an initial transform from the color space of the media to a Profile Connection Space (PCS) and, further, from the PCS to the color space of the output device. Alternatively, the transforming can be made from a composing space to an encoding space before the transforming is applied to the output device color space. In some implementations, the computer 105 can transfer the stored combined transform to a server computer 140, where the cinema or video data can be transformed by the color management module 135 residing on the server computer 140. In some implementations, the computer 105 can account for the color space of the display device on which the cinema or video data is previewed by, e.g., combining a transform corresponding to the color space of the display device with the combined transform corresponding to the output device and the media. In other implementations, the computer 105 can provide the combined transform to a remote location to enable previewing, wherein a transform of the color space of the remote location is combined with the combined transform to enable previewing the cinema or video data.

In some implementations, the server computer 140 can be operatively coupled to the computer 105 via wired interfaces. In other implementations, the server computer 140 can be operatively coupled to the engine via wireless interfaces over the network 145. For example, the color management module 135 can reside on the server computer 140 that can be operatively coupled to the computer 105 over the Internet. A user can generate a combined transform by selecting the first and second color spaces, based on a media encoding and an output device media, respectively, and transmit cinema or video data and the combined transform to the server computer 140 over, e.g., the Internet. The server computer 140 can receive the data and the combined transform, cause the color management module 135 to convert the data based on the combined transform, and transmit the transformed data to the computer 105. The computer 105 can display the transformed data on the display device 120, thereby enabling a user to visualize the appearance of the cinema or video data.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the specification or of what may be claimed, but rather as descriptions of features specific to particular implementations of the specification. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the specification have been described. Other implementations are within the scope of the following claims. For example, the actions recited in the claims can be performed in a different order and still achieve desirable results. In some implementations, the cinema or video data can be collected using a device, e.g., a video camera, in which the software application can be installed. The device can include a display unit, e.g., a screen, on which the user interface including the user interface controls to select color spaces can be displayed. In this manner, the user can select color spaces corresponding to final and preview output devices and visualize the appearance of the recorded cinema or video data. In some implementations, the user can add color spaces, including user-defined color spaces, to the list of color spaces in the user interface. In some implementations, the user interface can display a list of final and preview output devices. The software application can include instructions and the computer 105 can be configured to select color spaces based on the choices of output devices. In some implementations, the user interface can include the names of multiple color spaces and display a check box adjacent to the name of each color space. The user can select a color space by, e.g., selecting the check box adjacent to a color space.

In some implementations, the concatenation of the first transform, one or more intermediate transforms, and the second transform can include building the transform or re-purposing the original color data without the transform to offer a faithful reproduction on the display device. Concatenation can produce the one color space that is the end product of all the transforms.

What is claimed is:

1. A computer-implemented method comprising:
   presenting one or more user interface controls configured to receive selection of a first color space, from a plurality of first color spaces corresponding to media encodings for recording cinema or video data, and a second color space, from a plurality of second color spaces corresponding to output devices;
   receiving the selection;
   combining a first transform corresponding to the first color space and a second transform corresponding to the second color space, in accordance with the selection, to form a combined transform; and
   providing the combined transform for use in previewing the cinema or video data in accordance with the output devices corresponding to the selection.

2. The method of claim 1, wherein combining the first transform and the second transform comprises:
   combining the first transform and the second transform through one or more intermediate transforms corresponding to one or more intermediate color spaces; and
   concatenating the first transform, the one or more intermediate transforms, and the second transform to form the combined transform.

3. The method of claim 1, wherein providing the combined transform for use in previewing comprises storing the selection.

4. The method of claim 1, wherein the first transform and the second transform comprise profiles that conform to a format adopted by the International Color Consortium.

5. A non-transitory computer readable medium storing a computer program product, operable to cause data processing apparatus to perform operations comprising: presenting one or more user interface controls configured to receive selection of a first color space, from a plurality of first color spaces corresponding to media encodings for recording cinema or video data, and a second color space, from a plurality of second color spaces corresponding to output devices; receiving the selection; combining a first transform corresponding to the first color space and a second transform corresponding to the second color space, in accordance with the selection, to form a combined transform; and providing the combined transform for use in previewing the cinema or video data in accordance with the output devices corresponding to the selection.

6. The computer program product of claim 5, wherein combining the first transform and the second transform comprises:
    combining the first transform and the second transform through one or more intermediate transforms corresponding to one or more intermediate color spaces; and
    concatenating the first transform, the one or more intermediate transforms, and the second transform to form the combined transform.

7. The computer program product of claim 5, wherein providing the combined transform for use in previewing comprises storing the selection.

8. The computer program product of claim 5, wherein the first transform and the second transform comprise profiles that conform to a format adopted by the International Color Consortium.

9. A system comprising:
    a processor; and
    a computer-readable medium comprising instructions to cause the processor to perform operations comprising:
        presenting one or more user interface controls configured to receive selection of a first color space corresponding to media encodings for recording cinema or video data, from a plurality of first color spaces, and a second color space, from a plurality of second color spaces corresponding to output devices;
        receiving the selection;
        combining a first transform corresponding to the first color space and a second transform corresponding to the second color space, in accordance with the selection, to form a combined transform; and
        providing the combined transform for use in previewing the cinema or video data in accordance with the output devices corresponding to the selection.

10. The system of claim 9, wherein combining the first transform and the second transform comprises:
    combining the first transform and the second transform through one or more intermediate transforms corresponding to one or more intermediate color spaces; and
    concatenating the first transform, the one or more intermediate transforms, and the second transform to form the combined transform.

11. The system of claim 9, wherein providing the combined transform for use in previewing comprises storing the selection.

12. The system of claim 9, wherein the first transform and the second transform comprise profiles that conform to a format adopted by the International Color Consortium.

13. The system of claim 9, further comprising a server computer configured to:
    receive the combined transform; and
    transform the cinema or video data based on the received combined transform.

14. A system comprising:
    a first storage area for storing media encoding of cinema or video data, the media encoding corresponding to a compositing color space;
    a second storage area for storing scene-referred data, the scene-referred data obtained by a first transformation of the media encodings from the compositing color space to an output color space;
    a third storage area for storing output-referred data, the output-referred data obtained by a second transformation of the scene-referred data from the output color space to an output device color space;
    a display device for displaying preview data, the preview data obtained by a third transformation of the output-referred data from the output device color space to a color space corresponding to the display device; and
    a computer configured to perform operation comprising:
        presenting, on the display device, one or more user interface controls configured to enable a user to provide at least an output color space and an output device color space, and
        in response to receiving the at least an output color space and an output device color space, selecting a first transform corresponding to the output color space and a second transform corresponding to the output device color space, wherein a combination of the first transform and the second transform is used in the second transformation.

15. The system of claim 14, wherein the one or more user interface controls display a list displaying names of color spaces, wherein the user provides a color space by selecting a corresponding name from the list.

16. The system of claim 14, wherein the first transformation includes transformation from the compositing color space to the output color space through a profile connection space.

17. The system of claim 14, wherein the third transformation includes transformation from the output device color space to the color space corresponding to the display device through a profile connection space.

18. The system of claim 14, wherein the first storage area and the second storage area reside on a first storage device and the third storage area resides on a second storage device.

19. The system of claim 14, wherein the first storage area, the second storage area, and the third storage area reside on a corresponding first storage device, a second storage device, and a third storage device, respectively.

* * * * *